May 26, 1925.
F. A. STOLTE
DIRECTION INDICATOR
Filed Oct. 14, 1922
1,539,699
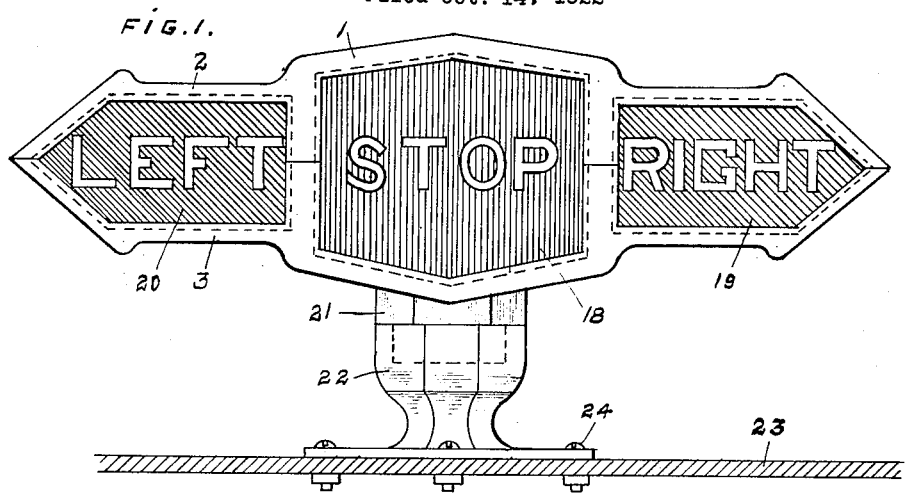
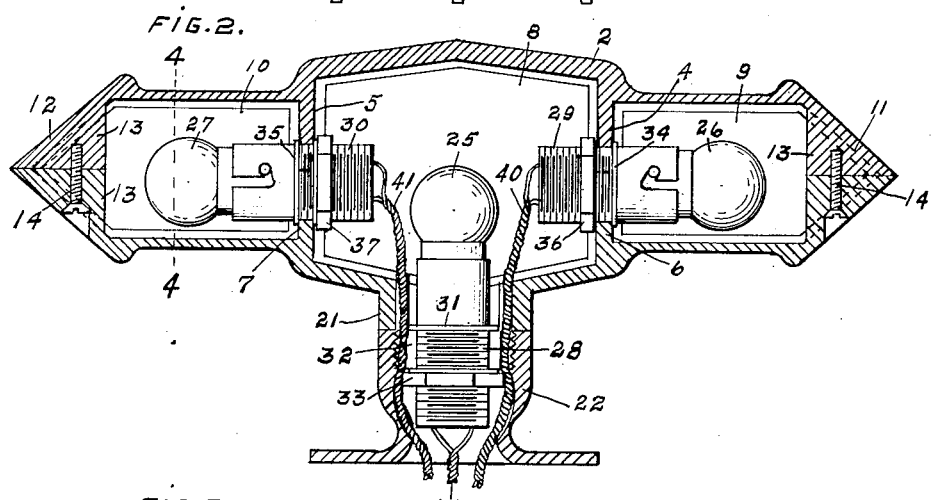
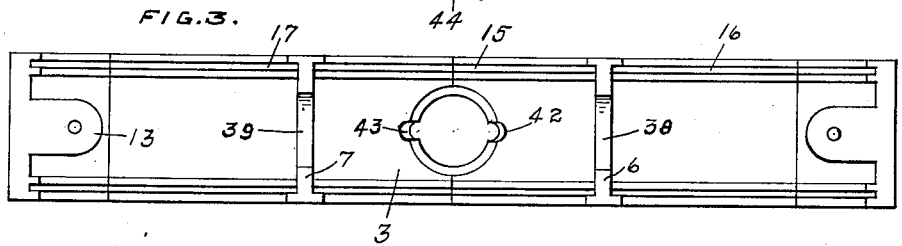
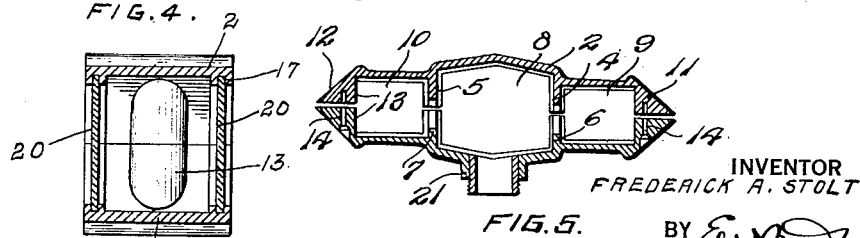
INVENTOR
FREDERICK A. STOLTE
BY 
ATTORNEY Patented May 26, 1925.

1,539,699

UNITED STATES PATENT OFFICE.

FREDERICK A. STOLTE, OF INDIANAPOLIS, INDIANA, ASSIGNOR TO CHARLES F. ECKLER, OF INDIANAPOLIS, INDIANA.

DIRECTION INDICATOR.

Application filed October 14, 1922. Serial No. 594,622.

*To all whom it may concern:*

Be it known that I, FREDERICK A. STOLTE, a citizen of the United States, residing at Indianapolis, in the county of Marion and State of Indiana, have invented certain new and useful Improvements in Direction Indicators, of which the following is a specification.

This invention relates to direction indicators and is designed primarily for use in connection with motor propelled vehicles, and the prime feature of the invention is the provision of a housing or casing having visual spaces and compartments in which are placed luminaries, for illuminating the various compartments when signals are to be made, to indicate the direction of travel or movement of the vehicle.

A further feature of the invention is in so constructing the housing that the various elements thereof may be quickly and easily assembled and secured together.

And a further feature of the invention is the provision of means for readily attaching the device to parts of a vehicle.

Other objects and advantages will be hereinafter more fully set forth and pointed out in the accompanying specification.

In the accompanying drawings,

Figure 1 is an elevation of the direction indicator showing the same applied to use, Figure 2 is a longitudinal central sectional view through the direction indicator.

Figure 3 is a top plan view of the lower section of the housing,

Figure 4 is a detail sectional view as seen on line 4—4, Figure 2, and

Figure 5 is a sectional view of the casing shown in Figure 2 prior to the parts being drawn together at their ends.

Referring to the drawings, 1 indicates the housing which is preferably constructed of two sections, an upper section 2 and a lower section 3, and these sections are provided with walls 4 and 5 and 6 and 7, respectively, which when the two sections 2 and 3 are properly connected together, divide the interior of the housing into a central compartment 8 and end compartments 9 and 10 which are at diametrically opposite ends of the central compartment 8. The outer ends of the sections 2 and 3, forming the end compartments 9 and 10, are provided with heads 11 and 12 respectively, which are preferably arrow shape and as they are pointed in opposite directions will indicate when a turn is to be made either to the right or left incident to the illumination of the interior of the compartments 9 and 10. On the inner faces of the tapered portions of the heads 11 and 12 are thickened portions or projections 13 and screws 14 are extended upwardly through the lower fillets and threaded into the upper thickened portions for locking the sections 2 and 3 together and by so constructing the sections 2 and 3 that the head ends thereof will be very slightly separated from each other before being drawn together by the screws 14, as shown in Fig. 5. The meeting portions of the sections 2 and 3 will be firmly clamped together when the screws 14 are properly tightened.

The opposite side faces of the compartments 8, 9 and 10 are open and along these open edges are provided channels 15, 16 and 17, and entered edgewise into said channels are sections of glass 18, 19 and 20 respectively, or other suitable transparent substances, so that visual openings will be provided on opposite faces of the housing, and if preferred the transparent section 18 may be of one color, preferably red, while the sections 19 and 20 may be of another color, preferably green, so that when the device is illuminated the signals will not become confused.

Projecting downwardly from the central portion of the lower section 3 is a tubular extension 21, the lower end of which is threaded to receive a supporting base 22, said base being secured to any portion of a vehicle, preferably a fender 23, by means of bolts 24 or other suitable means. The compartments 8, 9 and 10 are illuminated when necessary by luminaries 25, 26 and 27 respectively, preferably electric bulbs, the socket 28 carrying the luminary 25 extending through the tubular extension 21, while the sockets 29 and 30 carrying the luminaries 26 and 27 respectively, extend through the partitions formed by the walls 4 and 6 and 5 and 7 respectively, the socket 28 having a flange 31 which abuts against one face of the shoulder 32 within the tubular extension 21, while a nut 33 is threaded onto the opposite end of the socket and engages the opposite face of the shoulder 32. The sockets 29 and 30 are likewise provided with flanges 34 and 35 respectively, which engage one face of the partition walls while nuts 36 and 37 are threaded onto the sockets 29 and 30 and engage the opposite faces of the partitions.

The meeting edges of the walls 4 and 6 and 5 and 7 are cut out to form passages for the sockets 29 and 30, but in order to readily assemble the two sections of the housing together after the luminaries 26 and 27 have been properly located and clamped into position, the major portion of the sockets 29 and 30 rest within the cut out portions 38 and 39 in the walls 6 and 7, so that the sockets may be clamped into engagement with these walls prior to locking the sections 2 and 3 together, and by slightly tapering the lower side faces of the walls 4 and 5 they will readily enter between the flanges and nuts on the sections 34 and 35 when the two sections of the casing are being assembled. However, the extended surfaces engaged by the flanges and nuts will hold the sockets and luminaries carried thereby in rigid position.

The wires 40 and 41 leading to the luminaries 26 and 27 respectively, are carried up through the tubular extension 21 and supporting base 22, channels 42 and 43 being provided in the inner walls of the tubular extension and supporting base so that the wires 40 and 41 may be carried around the luminary 25, and these wires, together with the wires 44 connected with the luminary 25, are extended to parts of the vehicle convenient to the driver and connected to any suitable form of switch or push button.

Various signals may be employed in connection with the transparent sections, but preferably the word Stop is arranged in connection with the transparent section 18 extending in the rear of the central compartment 8, the word Right arranged for co-operation with the transparent sections 19, both front and rear, and the word Left with the transparent sections 20 both front and rear, these words being so arranged that they will not be perceptibly visual until such time as the compartments with which they co-operate are illuminated.

In assembling the parts of the indicator, the luminaries 25, 26 and 27 are first attached to parts of the lower section 3 and the transparent sections 18, 19 and 20, then entered in the channels 15, 16 and 17 at opposite edges of the lower section 3; the upper section 2 is then positioned over the lower section 3 and the upper edges of the transparent sections 18, 19 and 20 entered in the channels in the under face of the upper section 2, after which the two sections 2 and 3 are securely locked together by means of the screws 14 when the base 22 is engaged with the tubular extension 21. The indicator is now ready to be attached to any suitable part of the vehicle.

When the signal is to be given that the driver intends to stop or slow up the luminary 25 is illuminated which will cause a red light to be displayed at the central portion of the indicator, or in the compartment 8, such illumination also displaying the word Stop. If a right turn is to be made the luminary 26 is operated displaying a green light and also the word Right, while if a left turn is to be made the luminary 27 is illuminated, and owing to the shape of the compartments 9 and 10 the direction of travel will be fully indicated regardless of whether the words Right and Left are visual, and by providing the transparencies in both faces of the indicator the signals will be visible from either direction. To avoid confusion, however, in the operation of the luminary in the compartment 8 the forward transparent section in said compartment is preferably formed of ground glass which when illuminated will indicate to an approaching vehicle that the vehicle displaying the signal is to slow up or make a stop, while to a vehicle following a danger signal will be exhibited.

Having thus fully described my said invention, what I claim as new and desire to secure by Letters Patent, is:

1. In a direction indicator a housing formed of deformable complementary sections having walls with abutting edges so formed as to be normally spaced apart at their ends while touching between said ends and to be moved by the deformation of the sections into engagement, and means for drawing the ends of the sections into engagement, substantially as set forth.

2. In a direction indicator a housing formed of deformable complementary sections one having a partition with a U-shaped slot, means for securing a socket in the U-shaped slot and the other section having a complementary partition with a slot formed to cooperate with the U-shaped slot to surround the socket to hold the latter in position, substantially as set forth.

3. In a direction indicator a housing formed of deformable complementary sections one having a partition with a U-shaped slot, means for securing a socket in the U-shaped slot and the other section having a complementary partition with a slot formed to cooperate with the U-shaped slot to surround the socket to hold the latter in position, said sections having walls with abutting edges so formed as to be normally spaced apart at their ends while touching between said ends and to be moved by the deformation of the sections into engagement, and means for drawing the ends of the sections into engagement, substantially as set forth.

4. In a direction indicator, a housing having its ends forming arrow-shaped heads pointing in opposite directions said housing being formed of deformable complementary sections having walls with abutting edges so formed as to be normally spaced apart at their ends while touching between said ends and to be moved by the deformation of the sections into engagement, and means engaging said arrow-shaped heads for drawing the ends of the housing into engagement, substantially as set forth.

5. In a direction indicator a housing formed of deformable complementary sections one having a partition with a slot therein, means for securing a socket in the slot, said other section having a complementary partition with a slot formed to cooperate with the first mentioned slot to surround the socket and to hold the latter in position, the ends of said housing forming arrow-shaped heads pointing in opposite directions said end sections of said complementary sections being normally spaced at a greater distance apart than their intermediate portions, means engaging said arrow-shaped heads for drawing said sections together and means for retaining transparent sections in position at the opposite faces of the sections, substantially as set forth.

6. In a direction indicator, a housing having its ends forming arrow-shaped heads pointing in opposite directions said housing being formed of deformable complementary sections having walls with abutting edges so formed as to be normally spaced apart at their ends while touching between said ends and to be moved by the deformation of the sections into engagement, and means engaging said arrow-shaped heads for drawing the ends of the housing into engagement, and means on one of said complementary sections for supporting the housing on a support, substantially as set forth.

7. In a direction indicator, a housing formed of deformable complementary sections, one of said sections having a partition with a slot therein, means for securing a socket in said slot, said other section having a complementary partition with a slot formed to cooperate with the first mentioned slot to surround the socket and to hold the latter in position, the ends of said housing forming arrow-shaped heads pointing in opposite directions the ends of said complementary sections being normally spaced at a greater distance apart than their intermediate portions, projections formed on the inner walls of the arrow heads and means passing through one of said projections and into the other for drawing the sections together, substantially as set forth.

8. In a direction indicator, a housing formed of deformable complementary sections, one of said sections having a partition with a U-shaped slot therein, means for securing a socket in said U-shaped slot, said means comprising a shoulder and nut on said socket adapted to clamp the walls of the partition surrounding the U-shaped slot therebetween, the other section having a complementary partition with a slot formed to cooperate with the U-shaped slot to surround the socket to hold the latter in position, the edge of the slot in the complementary partition being beveled to provide means whereby the parts may be wedged together, substantially as set forth.

9. In a direction indicator, a housing comprising deformable complementary sections having partitions dividing said housing into a major central compartment with a compartment at each end thereof, said sections having walls with abutting edges so formed as to be normally spaced apart at their ends while touching between said ends and to be moved by the deformation of the sections into engagement, and means for drawing ends of the sections into engagement, substantially as set forth.

In witness whereof, I have hereunto set my hand and seal at Indianapolis, Indiana, this 11th day of October, A. D. nineteen hundred and twenty-two.

FREDERICK A. STOLTE. [L. S.]

Witnesses:
  CAREY S. FRYE,
  M. L. SHULER.